June 6, 1939.  C. M. YODER  2,160,999
TRIMMING AND/OR CUTTING MECHANISM
Filed March 25, 1935  9 Sheets-Sheet 1

INVENTOR
CARL M. YODER.
BY
Geo B Pitts
ATTORNEY

June 6, 1939.  C. M. YODER  2,160,999
TRIMMING AND/OR CUTTING MECHANISM
Filed March 25, 1935  9 Sheets-Sheet 3

INVENTOR
CARL M. YODER.
BY Geo. B. Petts
ATTORNEY

June 6, 1939.  C. M. YODER  2,160,999
TRIMMING AND/OR CUTTING MECHANISM
Filed March 25, 1935   9 Sheets-Sheet 4
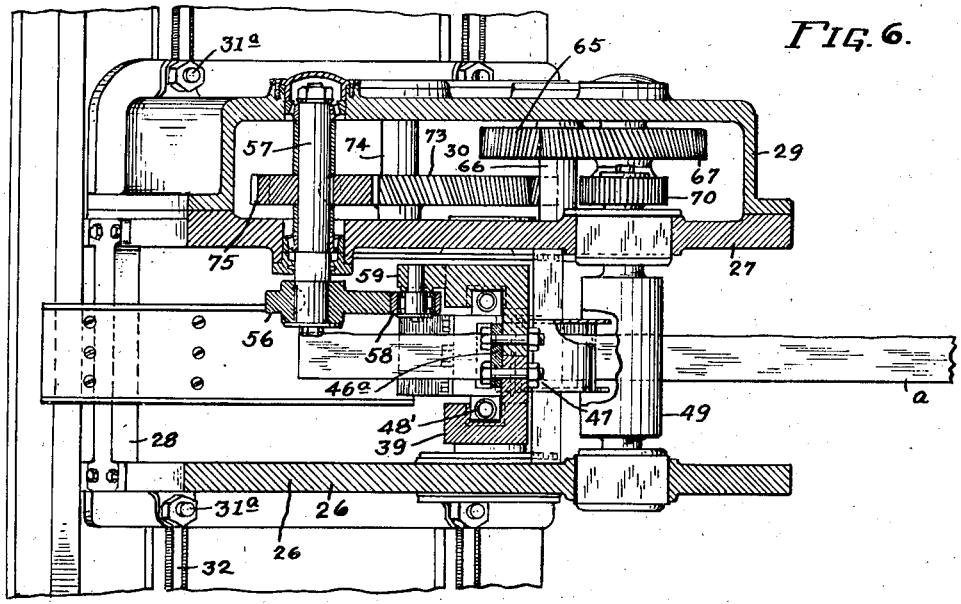
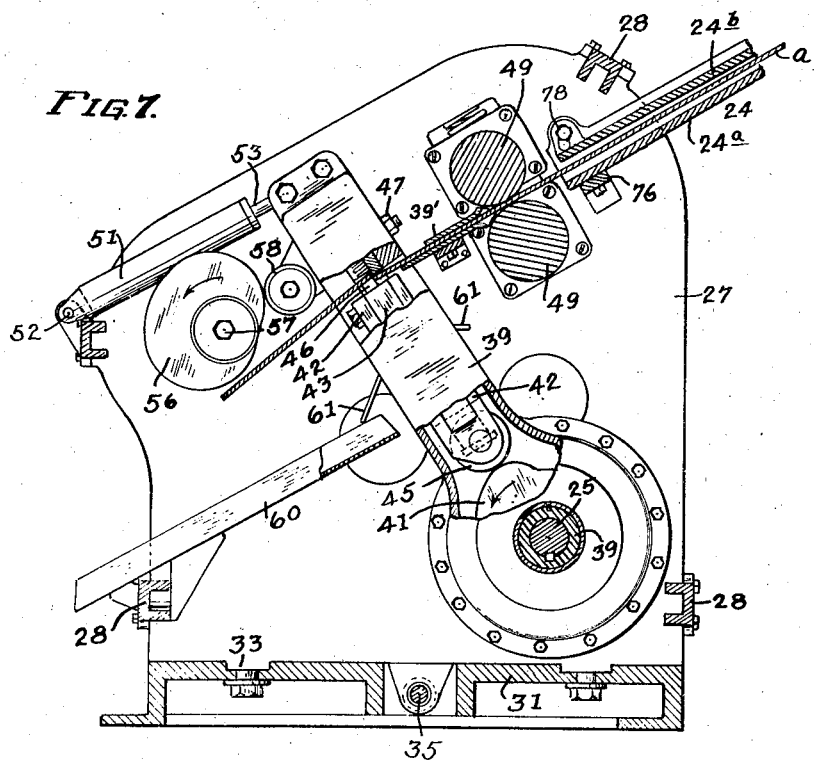
INVENTOR
CARL M. YODER.
BY
ATTORNEY

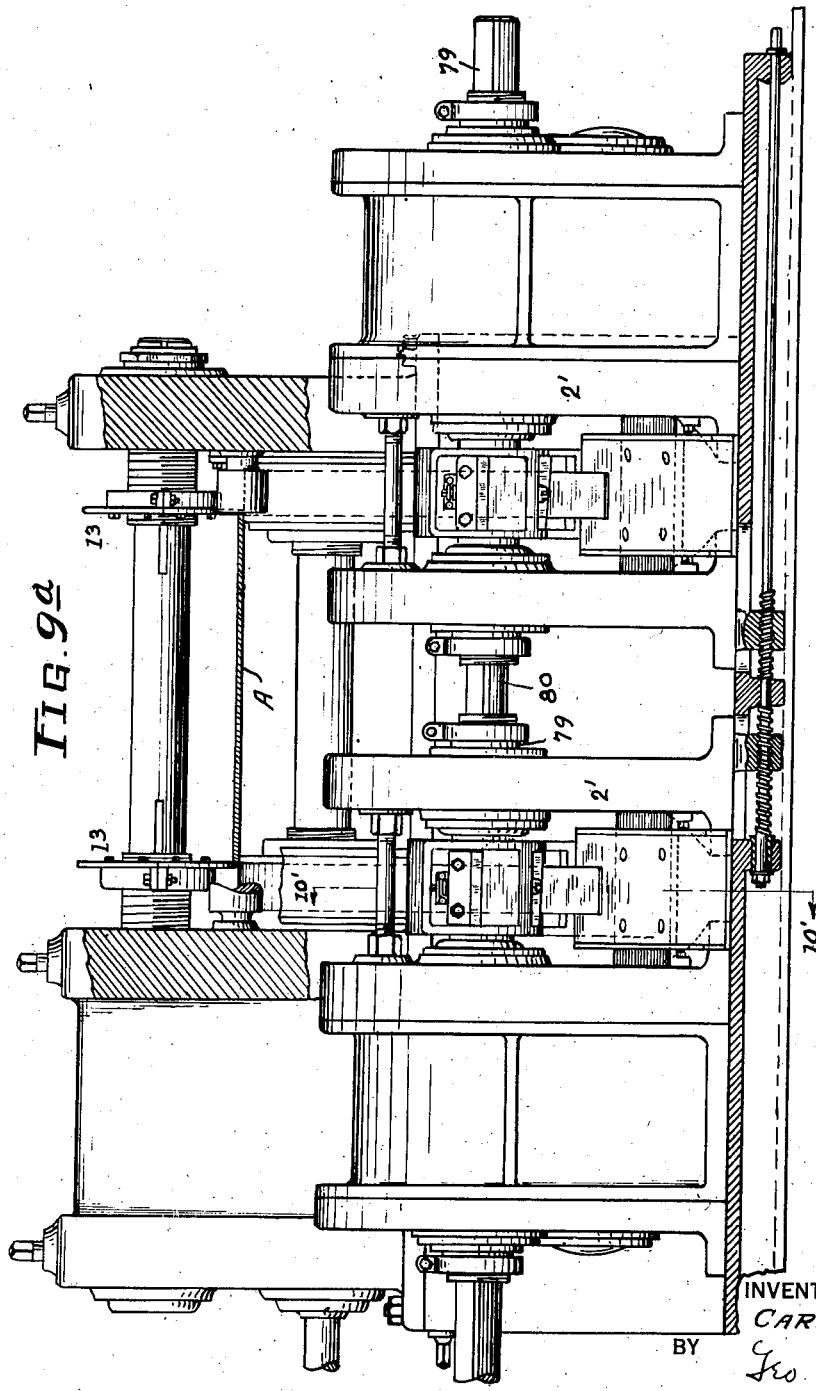

June 6, 1939. C. M. YODER 2,160,999
TRIMMING AND/OR CUTTING MECHANISM
Filed March 25, 1935 9 Sheets-Sheet 6

INVENTOR
CARL M. YODER.
BY
ATTORNEY.

June 6, 1939. C. M. YODER 2,160,999
TRIMMING AND/OR CUTTING MECHANISM
Filed March 25, 1935 9 Sheets-Sheet 7

INVENTOR
CARL M. YODER.
BY
ATTORNEY

June 6, 1939. C. M. YODER 2,160,999
TRIMMING AND/OR CUTTING MECHANISM
Filed March 25, 1935 9 Sheets-Sheet 8
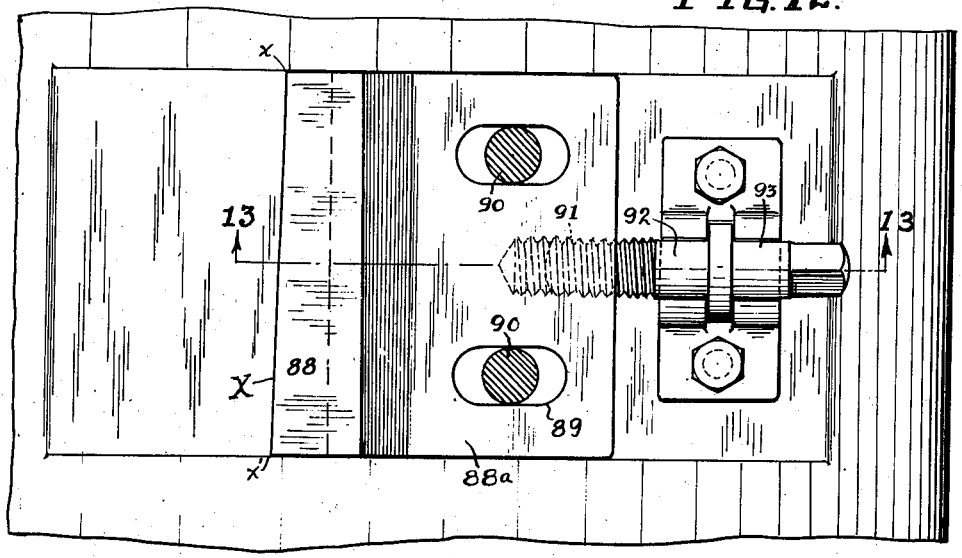
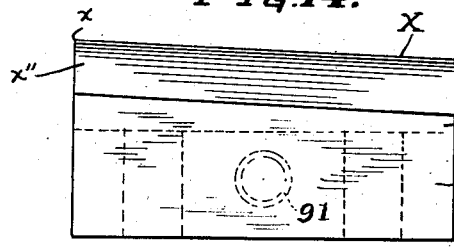
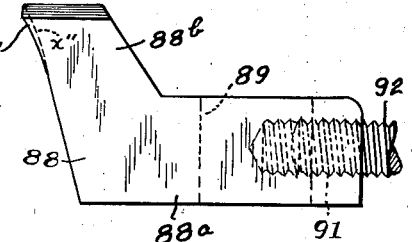
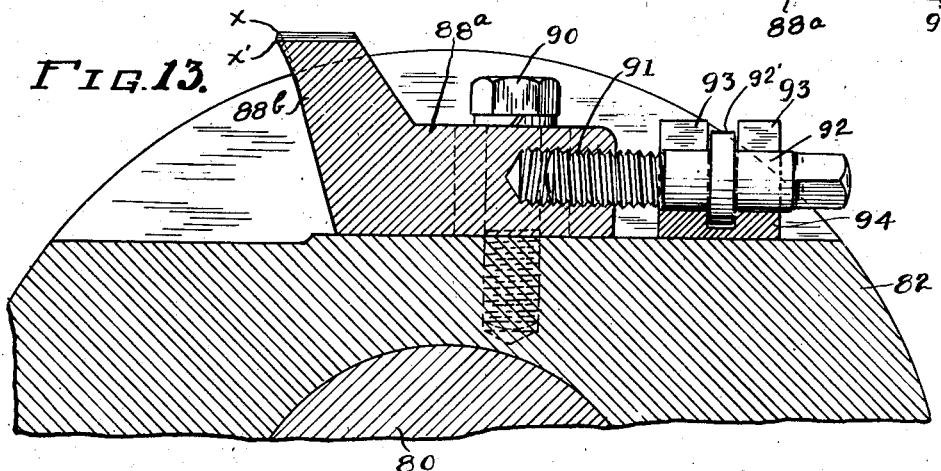
INVENTOR
*CARL M. YODER.*
BY
ATTORNEY June 6, 1939.  C. M. YODER  2,160,999
TRIMMING AND/OR CUTTING MECHANISM
Filed March 25, 1935  9 Sheets-Sheet 9

INVENTOR
CARL M. YODER.
BY
ATTORNEY

Patented June 6, 1939

2,160,999

UNITED STATES PATENT OFFICE 2,160,999

TRIMMING AND/OR CUTTING MECHANISM

Carl M. Yoder, Lakewood, Ohio

Application March 25, 1935, Serial No. 12,818

18 Claims. (Cl. 164—68)

This invention relates to apparatus for trimming either or both edges of sheet material ready for fabrication and/or for cutting into lengths the trimmed-off or scrap material, whereby such scrap material may be readily handled, transported and supplied to a furnace for re-melting.

The herein disclosed apparatus is adapted to trim sheet metal or steel plate of varying widths and thicknesses to any predetermined width. The material may be hot or cold rolled and supplied to the trimming mechanism in any desired length, upwards of several hundred feet. The trimming mechanism serves to cut off the rough marginal edges of the material as it comes from the mill and to provide material having a predetermined width for fabrication purposes.

One object of the invention is to provide an improved scrap cutting mechanism of relatively simple construction and capable of being associated with a trimming mechanism.

Another object of the invention is to provide an improved cutting mechanism capable of operating effectively without affecting the feed of the trimmed material.

Another object of the invention is to provide an improved material cutting mechanism having shear cutting devices mounted to move with the material while operating.

Another object of the invention is to provide an improved material cutting mechanism having a pair of rotary cutters shaped and related to effect a shear cut upon the material.

Another object of the invention is to provide an improved material trimming mechanism having a pair of rotary cutters shaped and related to operate effectively upon the material.

A further object of the invention is to provide, in apparatus for trimming either or both edges of sheet material, an improved mounting for the trimming devices.

A further object of the invention is to provide an improved apparatus for trimming either or both edges of sheet material and for cutting the trimmed-off material into lengths to facilitate handling and transportation of the latter material.

A further object of the invention is to provide in an apparatus for trimming either or both edges of sheet material and cutting the trimmed-off material into lengths, an improved guide means for the trimmed-off material to prevent distortion thereof while feeding to the cutting devices therefor.

A still further object of the invention is to provide an improved apparatus having adjustable sets of edge trimming devices and mechanisms for cutting into lengths the trimmed-off material mounted for adjustment to position them in operative relation to the sets of edge trimming devices.

Other objects of the invention will be apparent to those skilled in the art to which my invention relates from the following description taken in connection with the accompanying drawings, wherein.

Figure 1:
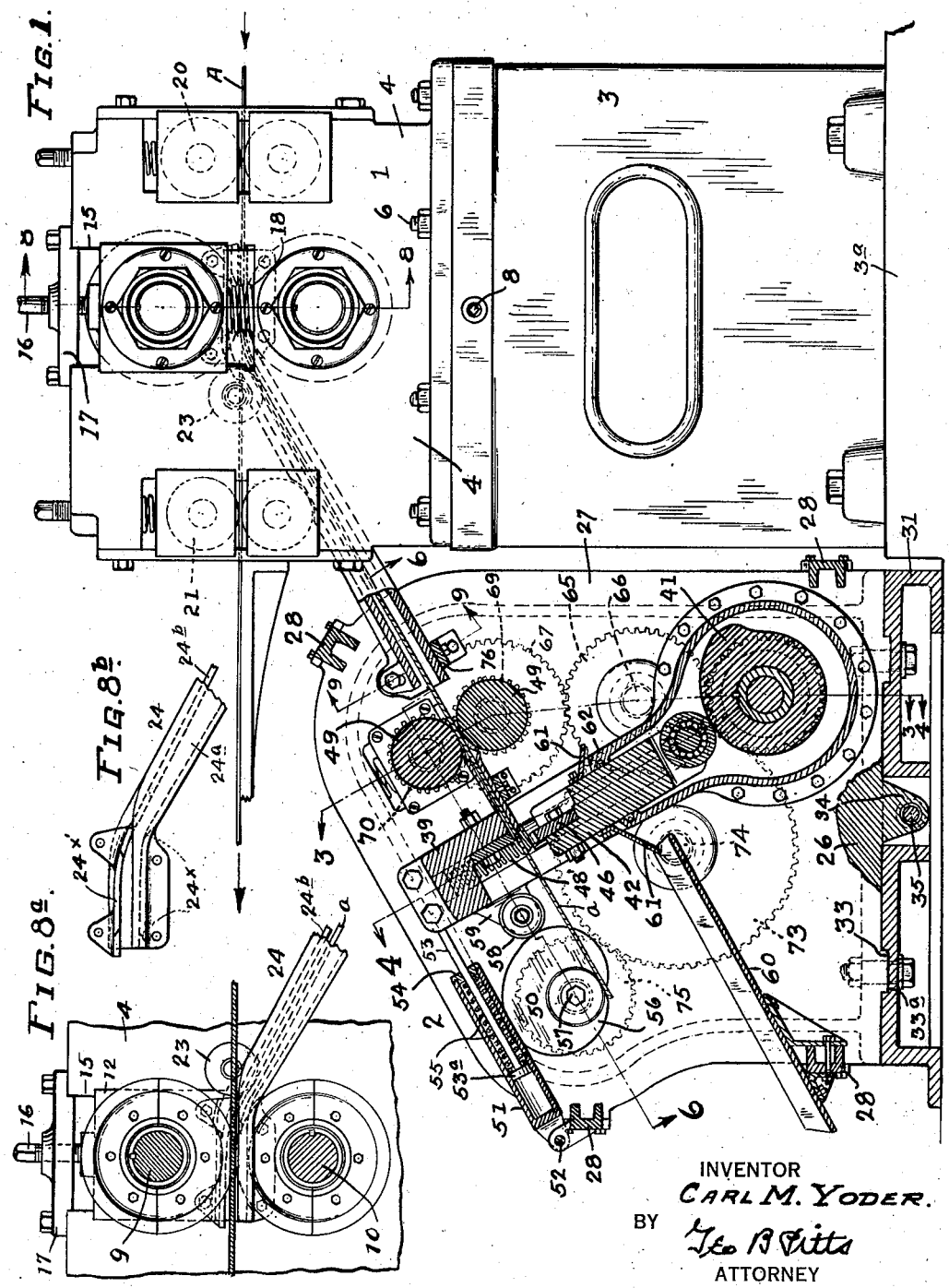
Fig. 1 is a view, partly in side elevation and partly in section on the line 1—1 of Fig. 2, of an apparatus embodying my invention.
Figure 3:
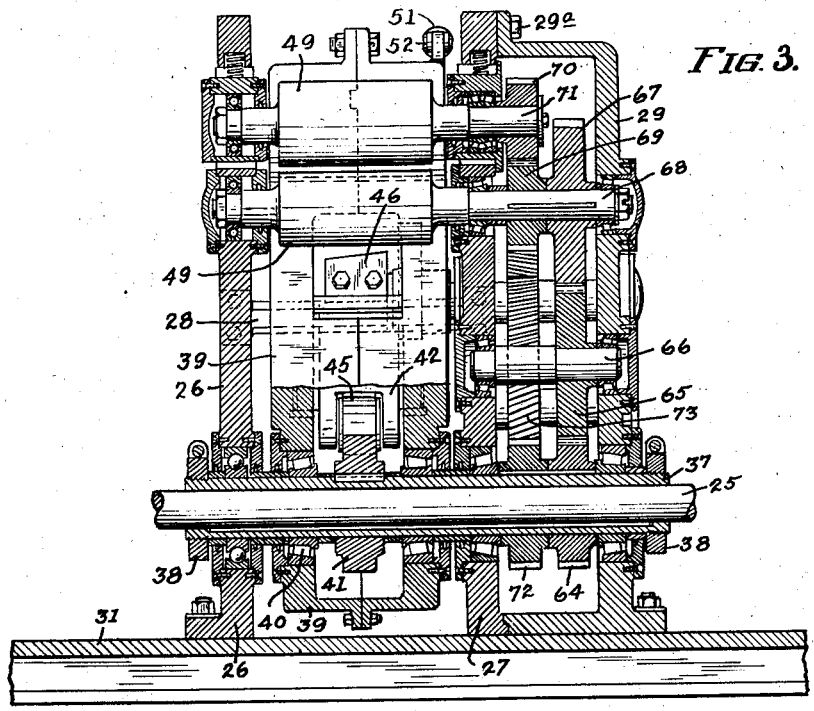
Figure 4:
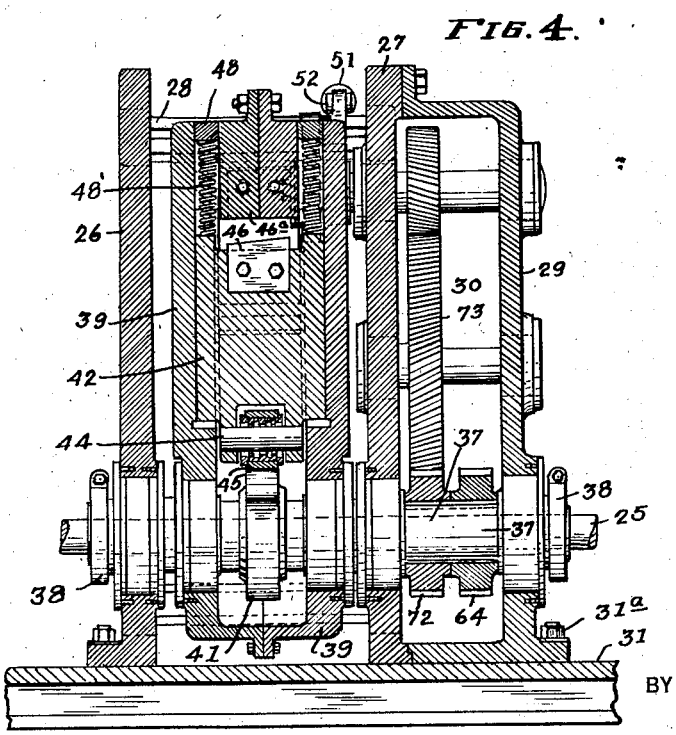

Figs. 3 and 4 are sections on the lines 3—3 and 4—4, respectively, of Fig. 1.

Figure 5:
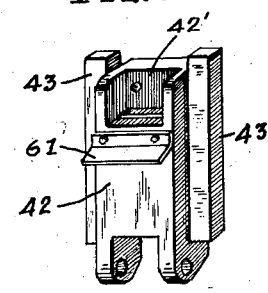

Fig. 5 is a detail view of the reciprocatable slide or support for one of the cutters for cutting the trimmed-off or scrap material.

Fig. 6 is a section on the line 6—6 of Fig. 1.

Fig. 7 is a view of the scrap cutting mechanism substantially similar to that shown in Fig. 1, but showing the parts in operated position.

Figs. 8 and 9 are fragmentary sections on the lines 8—8 and 9—9, respectively, of Fig. 1.

Fig. 8a is a section on the line 8a—8a of Fig. 8.

Fig. 8b is a fragmentary view of the upper end of the chute.

Fig. 9a is an elevation of a different embodiment of the invention, wherein each scrap cutting mechanism employs a pair of rotary cutting devices.

Figure 10:
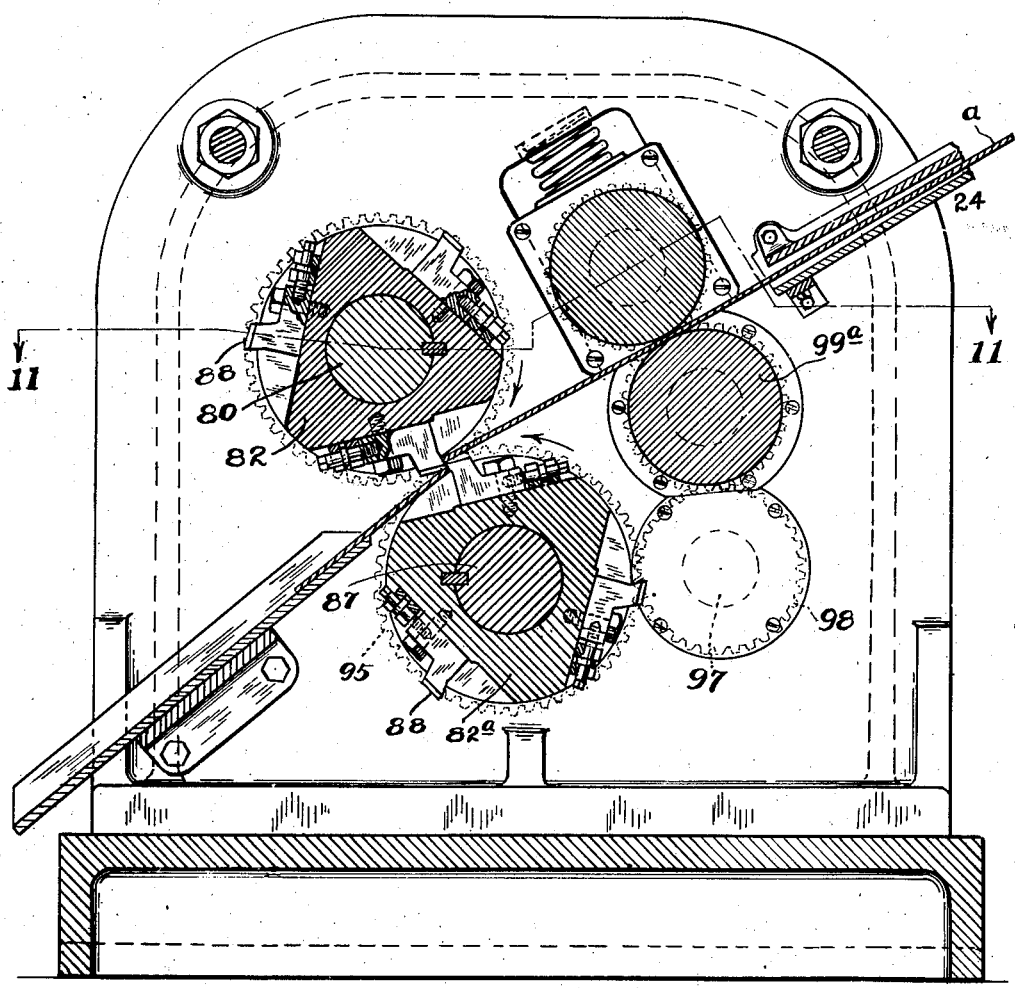

Fig. 10 is a section on the line 10—10 of Fig. 11 and illustrating a modified form of the construction shown in Fig. 9a; also, being a section on the line 10'—10' of Fig. 9a except for modifications later set forth.

Figure 11:
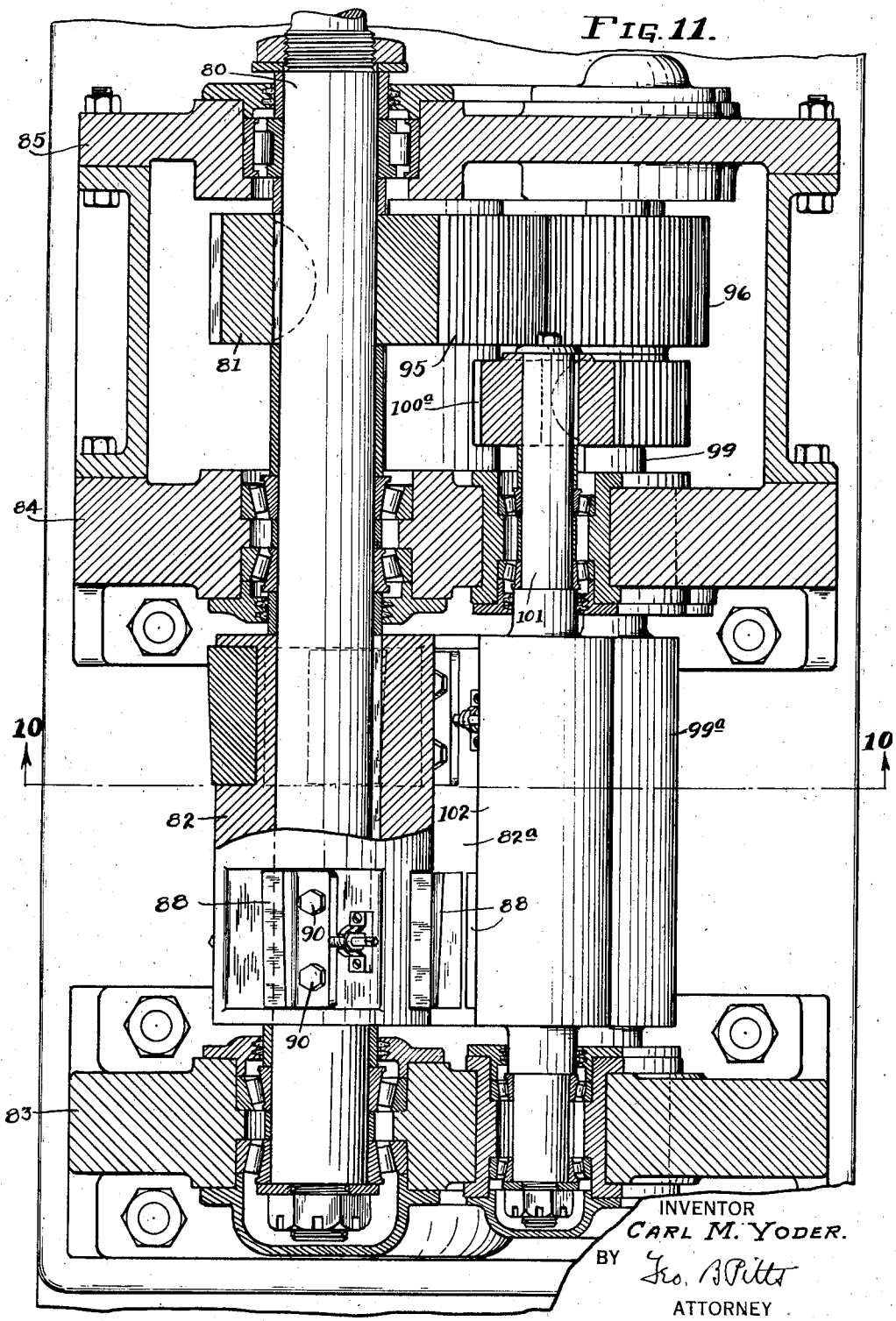

Fig. 11 is a section on the line 11—11 of Fig. 10.

Fig. 12 is a fragmentary view showing one of the rotary cutting devices and its mounting, enlarged.

Fig. 13 is a section on the line 13—13 of Fig. 12.

Figs. 14 and 15 are detail views.

Figure 16:
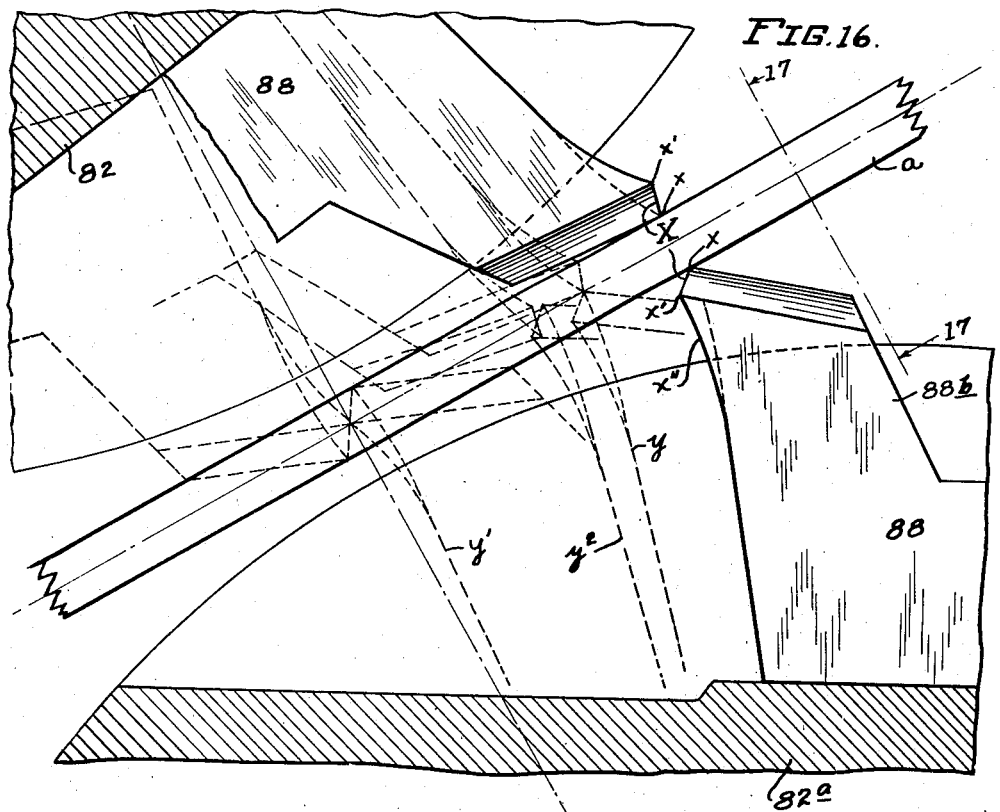
Figure 17:
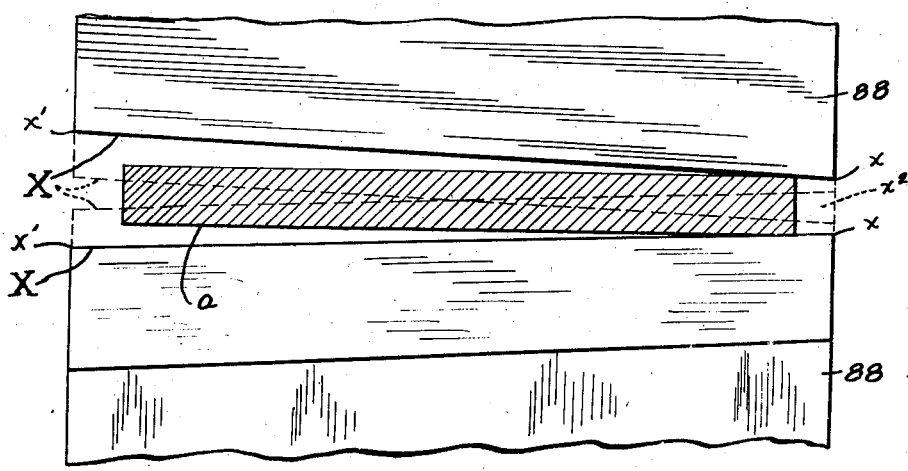

Figs. 16 and 17 are fragmentary views showing more or less schematically the knife edges, Fig. 17 being a sectional view on line 17—17 of Fig. 16.

In the drawings, 1 indicates as an entirety the trimming mechanism and 2 indicates as an entirety the scrap cutting mechanism, two such mechanisms in side by side relation being shown for reasons which will later be apparent.

Of the trimming mechanism 1, 3 indicates a suitable base or support on which are adjustably mounted standards 4, 5, the latter having connected to it (preferably integrally) a casing 5a which encloses suitable gearing for a purpose later set forth. The base 3 is suitably secured to a bed 3a.

The lower ends of the standards and casing 5a are provided with flanged portions which are secured to the base by bolts and nuts 6 and such ends and the base may be provided with complementary guides (not shown) to permit adjustment of the standards and casing. To provide for adjustment of the standards, the latter are provided with depending lugs 7 having alined threaded openings for screws 8 (see Fig. 8), the ends of which project beyond the sides of the base 3 and each is shaped to permit the application of a suitable tool.

9, 10, indicate upper and lower shafts slidably fitting at their opposite ends into sleeves 11 the outer end portions of which rotate in journal boxes 12, supported in the standards 4, 5.

Each sleeve 11 is provided inwardly of its outer end with a collar 11' and between this collar and a nut 11x are provided suitable races for anti-friction elements engaging races mounted in the adjacent journal box. In this form of construction each sleeve is rotatable in the adjacent journal box and also connected thereto so that when the adjacent standard is adjusted on the base 3, as above set forth, the journal box and sleeve move therewith as a unitary assembly relative to the adjacent shaft. 13, 13, indicate sets of trimming devices mounted on and secured to the inner end portions of the sleeves 11 in a manner later set forth. The sleeves 11 are keyed to the shafts 9, 10, so that rotation of the latter serves to rotate the sets of trimming devices 13, 13, for trimming off the marginal edge portions a of the material A. The journal boxes 12 for the shaft 10 are mounted in suitable openings formed in the standards 4, 5. The journal boxes 12 for the shaft 9 slidably fit openings 15 formed in the standards 4, 5, to permit of their vertical adjustment to accommodate the trimming devices 13, 13 to different thicknesses of material. To permit of such adjustment, I provide threaded shanks 16 which are rotatably connected at their lower ends to the journal boxes for the shaft 9. The upper end of each shank 16 extends through a threaded opening formed in a member 17 bridging the adjacent opening 15 and suitably secured to the upper end of the standard; accordingly, by rotating the shanks 16, the journal boxes 12 for the shaft 9 may be raised or lowered. 18 indicates springs interposed between adjacent boxes 12 and normally tending to raise the upper box 12 to maintain it in fixed adjusted position. The upper free ends of the shanks 16 may be shaped to take a suitable tool for turning them when adjustment is to be effected.

Each trimming device 13 may be removably secured to the adjacent collar 11', but by preference provision is made for adjustment of the device axially of the adjacent shaft and relative to the adjacent box 12. For this purpose the inner end of each sleeve 11 is extended and provided with screw threads 11a and the adjacent device 13 is connected to a nut 13a to engage the threads 11a. Each device 13 and its nut 13a are constructed of two semi-circular sections, each section being rigidly connected to one of the nut sections (preferably by bolts), and the nut sections are provided with related lugs which are detachably secured together by bolts 19. The bolts 19, when tightened, serve to clamp the nut sections to the adjacent sleeve 11 and when loosened the nut 13a may be rotated to adjust the trimming device along the adjacent sleeve, whereby the devices of each set may be operatively related to each other and those devices of each set related to the devices of the other set to trim the material A to the desired width. Also, this sectional construction of each trimming device 13 and its mounting on the adjacent sleeve 11 and shaft permits the removal of the device and replacement of a new device without disassembly of the shaft and its mounting.

20 indicates a pair of feed rolls in front of the sets of trimming devices 13 for feeding the material thereto and 21 indicates a pair of feed rolls rearward of the sets of trimming devices 13. The rolls 20 and 21 and shafts 9, 10, are driven by suitable gearing within the casing 5a, the gearing being driven by a shaft 22, which may be connected to a motor or other power means (not shown).

Where one marginal edge of the material only is to be trimmed, one set of trimming devices 13 may be removed.

23 indicates a roll disposed rearward of each set of trimming devices 13 and arranged to engage the trimmed-off edge portion a and guide it downwardly into a chute indicated as an entirety at 24, which leads to the adjacent cutting mechanism 2. Where the material is relatively wide as shown in Figs. 1 to 8, inclusive, I provide two scrap cutting mechanisms 2, one for cutting into lengths each trimmed-off marginal edge, but by preference the elements of both mechanisms are driven by and operated from a single shaft 25. The cutting mechanisms 2 are adjustable relative to each other and to aline them relative to the sets of trimming devices 13, as later set forth, but as the cutting devices are relatively wide they permit adjustment of the trimming devices through a considerable range without being moved in either direction.

Figure 2:
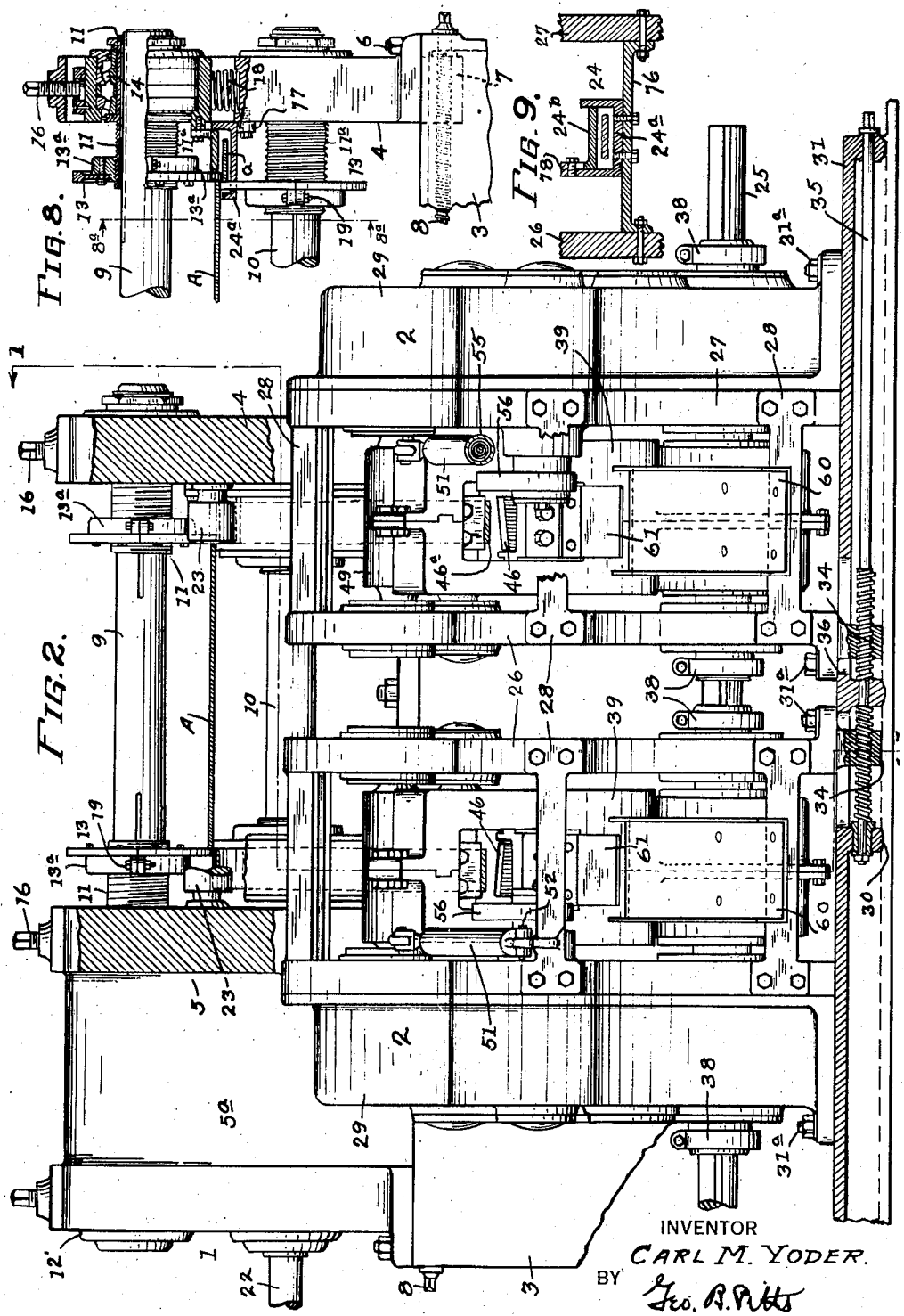
Fig. 2 is a front elevation of the apparatus looking towards the right of Fig. 1, parts being omitted or broken away to facilitate the disclosure.

As the cutting mechanisms 2 are similar in construction, except that the elements of one are oppositely related to the elements of the other, as will be understood from Fig. 2, the following description of one mechanism will suffice for both.

Each mechanism 2 comprises the following: 26, 27, indicate spaced upright members suitably connected in rigid relation by cross members 28. 29 indicates a casting rigidly secured by bolts 29a to the upright member 27 and shaped to form therewith a chamber or casing enclosing a driving means 30 to which reference will later be made. The upright member 26 and casting 29 are provided at their lower ends with flanges which are secured by bolts 31a to a base plate 31, the latter being secured to the bed 3a in any desired manner. The bolts 31a extend through slots 32 formed in the plate 31 and when loosened the upright members 26, 27 and casting 29 may be bodily moved on the plate 31. As shown in Figs. 1 and 7, the members 26, 27 and casting 29 are provided with keys 33 which fit ways 33a in the plate 31 to guide these parts transversely when adjusted. The members 26 are provided with depending lugs 34 having formed therein right and left hand threaded openings for correspondingly threaded portions on a shaft 35 which is mounted in bearings 36 provided on the plate 31 (Fig. 2), the outer end of the shaft being shaped to take a suitable tool, whereby rotation of the shaft will adjust the mechanisms 2 toward and away from each other; altho it will be understood that I may provide for the independent adjustment of these mechanisms.

From the foregoing description it will be noted that (a) the standards 4, 5, are adjustable transversely of the direction of feed of the material, (b) the sets of trimming devices may be adjusted axially of the shafts 9; 10, and the mechanism 2 may be adjusted transversely so that the material may be trimmed to varying predetermined widths and the cutting devices for the trimmed-off or scrap material a may be alined with the feed or discharge of the latter.

37 indicates a sleeve keyed to the shaft 25 and extending through and mounted in suitable bearings provided in the walls of the members 26, 27 and casting 29 and having threaded on its opposite ends split nuts 38 tightened against a plurality of spacing and other elements (later referred to) to prevent endwise movement of the sleeve. 39 indicates a casing member rotatably supported, by suitable anti-friction bearings 40, at one end, on the sleeve 37, whereby its opposite end or body portion may be oscillated about the axis of the sleeve 37 and shaft 25 as later set forth. The member 39 is formed in two rigidly connected sections to permit of their assembly and these sections are shaped to form between them a space to accommodate a cam 41 fixed to the sleeve 37 and a reciprocatable slide 42, arranged to be actuating in an outward direction thereby to effect the scrap cutting operation as later set forth. The opposite inner side walls of the body portion of the member 39 are formed with suitable ways for guides 43 provided on the slide 42. The lower end of the slide 42 is provided with bifurcations which support a shaft 44 for a roller 45, the roller being arranged to ride on the cam 41 as the latter rotates. The upper end of the slide 42 is shaped to form a seat 42' for a cutting device 46, which co-operates with a cutting device 46a fixed by bolts 47 to the outer ends of and within the sections of the member 39, to cut the scrap a into lengths. The upper ends of the guide ways are closed by suitable plugs 48 (see Fig. 4) and between these plugs and the upper ends of the guides 43 I provide coiled springs 48' which normally tend to bias the slide 42 downwardly in opposition to the throw of the cam 41, so that the latter effects a positive movement of the slide outwardly and controls the inward movement of the slide under the influence of the springs 48'. As shown in Figs. 1 and 7, the front and rear walls of the member 39 are cut away to form openings for the scrap a to pass through between the cutting devices 46, 46a, and preferably I provide a pair of spaced guide walls 39' for the scrap a between a pair of feed rolls 49 and the member 39 to overcome any tendency of the scrap to twist or flex and thus affect the operation of the member 39, or cutting devices. Due to the fact that the trimmed-off marginal edge a is of indefinite length, (in fact, it may be several hundred feet in length) and is fed continuously by the pair of driven feed rolls 49 arranged adjacent the discharge end of the chute 24, means 50 (which is preferably cam controlled) for oscillating the member 39 in co-operative relation to the reciprocations of the slide 42, is provided, so that during the cutting stroke of the cutting device 46 and while effecting its cutting operation, the body portion of the member 39 and parts carried thereby move with the scrap a. Of the means 50, 51 indicates a cylinder pivoted at its outer end at 52 on the adjacent member 28. 53 indicates a plunger extending through a plug 54 removably mounted in the outer end of the cylinder and into the latter and provided at its outer end with a head 53a. Between the head 53a and the plug 54 is provided a coiled spring 55 (coiled around the plunger 53) which normally tends to swing the member 39 in one direction, that is, in the direction in which the scrap a moves. 56 indicates a cam fixed to a driven shaft 57 and shaped and arranged to permit the movement of the member 39 under the influence of the spring 55 and to swing the member 39 in the opposite direction in opposition to the spring. The cam 56 is arranged to engage a roller 58 suitably supported on a stud shaft supported in a lug 59 projecting from the side of the member 39 (see Fig. 6). The cam 56 is so shaped that it permits swinging of the member under the influence of the spring 55 in the direction above indicated (counter-clockwise as viewed in Figs. 1 and 7) at the time the cam 41 is effecting the cutting stroke of the cutting device 46 but, following the cutting operation and while the device 46 is receding from the device 46a, the cam 56 swings the member in the opposite direction to its first position ready for the succeeding cutting operation, the speed of the cams 41 and 56 being so related that the scrap a is cut into predetermined substantially uniform lengths. It will be obvious that the cam 56 may be provided with a cam groove for a device carried by the member 39 so as to positively operate the member 39 in both directions. The cut lengths of scrap a gravitate onto a chute 60 for discharge into a receiver (not shown). 61 indicates guards supported on the opposite sides of the slide 42 and serving to prevent metallic grit, resulting from the cutting operations, from getting into the interior of the member 39. I also provide a gland or gasket 62 between the walls of the slide 42 and member 39 to further prevent grit from entering the member 39.

The feed rolls 49 and cam 56 are preferably driven by the sleeve 37 to insure the co-operative movements of the slide 42 and member 39, as follows: 64 indicates a gear fixed to the sleeve 37 and meshing with an idler 65 on a shaft 66, which is mounted in suitable bearings provided in the upright member 27 and wall of the casting 29. The idler 65 meshes with a gear 67 fixed to the extended end of the shaft 68 for the lower feed roll 49, which shaft is mounted in suitable bearings in the members 26, 27 and wall of the casting 29. The shaft 68 has fixed to it a gear 69 which meshes with a gear 70 fixed to the extended end of the shaft 71 for the upper feed roll 49. 72 indicates a gear fixed to the sleeve 37 and meshing with an idler 73 rotatable on a shaft 74 (mounted similarly to the shaft 66) and the idler 73 in turn meshes with a gear 75 fixed to the cam shaft 57, which is mounted similarly to the shafts 66 and 74.

The chute 24 preferably comprises a lower channel shaped member 24a and an upper co-operating guide member 24b forming a guide and chute for the scrap a to prevent distortion or twisting thereof while feeding to the cutting devices 46, 46a, incident to the operation of the trimming devices 13. The channel shaped member is fixedly supported at its lower end on a cross bar 76 between and secured at its ends to the members 26, 27, and has at its upper end a depending lug 77 (Fig. 8) which is secured to the adjacent journal box for the shaft 10. The upper end of the member 24b is provided at its outer side with an upstanding lug which is secured to and is adjustable with the adjacent journal box for the shaft 9 (see Fig. 8). The lower end of the member 24b is provided at its inner side with an upstanding lug 78 which is secured to the adjacent side wall of the member 24a by a suitable bolt. The bolt opening in the lug 78 is elongated to permit of adjustment of the member 24b with the journal box to which it is connected at its upper end.

The upper ends of the members 24a, 24b, of each chute extend forwardly of the adjacent trimming devices 13 (see Figs. 8a and 8b) to receive the marginal edge of the material A before the material is trimmed. The advantage of this arrangement is this: the marginal edge is rough and often varies to a large extend along a wavering line outwardly and inwardly. If this marginal edge at the point of trimming extends inwardly so that the trimmed-off edge has a width less than the height of the space between the guide walls of the members 24a, 24b, such trimmed-off edge will start to twist and thus affect the feed of the scrap a through the chute 24 and feed rolls 49 to the cutting devices 46, 46a; but by extending the guide walls 24a, 24b, forwardly of the trimming devices 13 (see Figs. 8a and 8b) they will engage the wider portion of the marginal edge forward of the reduced portion and thus prevent the latter from starting to twist even though such reduced portion is of less width than the height of the space between the chute walls. Accordingly, all portions of the trimmed-off edge will be maintained in a flat position while feeding to the cutting devices. To accommodate the cutting devices 13, the lower member 24a is cut-away as shown in Figs. 8 and 8b, (see dotted lined 24x in Fig. 8b) and the upper member 24b is cut away at 24x' (see Figs. 8 and 8b).

It will be understood that the chute 24 shown in Figs. 9a and 10 is constructed similarly to that above described and shown in Figs. 1, 2, 7, 8, 8a and 8b.

In Figs. 9a to 15, inclusive, I have shown a different embodiment of the scrap cutting mechanisms wherein I provide a pair of driven shafts each provided with an arbor carrying a plurality of cutting devices, each of which coacts with a cutting device on the other shaft to shear cut the scrap. In Fig. 9a I show a trimming mechanism 13 similarly to that already described and two scrap cutting mechanisms of the rotary type, each indicated as an entirety at 2' and bodily adjustable, as illustrated in Figs. 1 and 2 relative to the sets of trimming devices 13. The shafts for the cutting devices and the feed rolls are drivingly connected to a sleeve 79 keyed to and slidable on a driven shaft 80, that is, instead of the shaft 80 being connected directly to the gear (see gear 81 in Fig. 11) and the arbor for one series of cutting devices (see arbor 82 in Fig. 11), the sleeve 79 is interposed therebetween to permit of unitary assembly of these parts and their adjustment bodily along the shaft 80. Except for the interpositioning of the sleeve 79 and in Figs. 10 and 11 each arbor 82, 82a, carries two series of cutting devices (for a reason later set forth), each mechanism 2' shown in Fig. 9a is similar to the mechanism shown in Figs. 10 and 11.

Referring particularly to Figs. 10 and 11, the shaft 80 is mounted in suitable bearings provided in spaced upright members or standards 83, 84, and 85, these members being mounted on a base 86 and the space between the standards 84 and 85 being closed by a wall to form a gear casing. The shaft 80 has fixed to it the arbor 82, whereas the arbor 82a is keyed to a shaft 87 which is suitably mounted in the members 83, 84. As shown in Fig. 11, each of the arbors 82, 82a, carries two series of cutting devices 88, each series on one arbor being alined with one series on the other arbor so that these devices may co-act to cut the scrap a as shown in Fig. 10. This arrangement and mounting of the cutting devices is advantageous where the material A to be trimmed is relatively narrow. The cutting devices of each series are preferably uniformly spaced about the axis of the arbor. It will be understood that the number of devices in each series may be increased or decreased and that the length of the cut sections will depend upon the speed of the shafts relative to the rate of movement of the scrap a. Each arbor 82, 82a, is provided with seats, one for each device 88, to which it is adjustably secured. Each device 88 consists of a base 88a and an arm 88b extending upwardly from its forward end and terminating in an active cutting edge to which reference will later be made. The base 88a is formed with openings 89 through which extend bolts 90 threaded into the adjacent arbor to secure the base 88a to the latter, the openings being elongated transversely to the axis of the arbor to permit of adjustment of the cutting device. 91 indicates a threaded opening formed in and extending inwardly from the rear wall of the base 88a and arranged to receive the threaded portion of a shaft 92. The shaft 92 is rotatably mounted in seats formed in a pair of spaced lugs 93 integral with a base plate 94, which is suitably secured to the arbor (see Fig. 12), and between the lugs the shaft is provided with a collar 92' which prevents endwise movement of the shaft when it is rotated. The outer end of the shaft 92 is shaped to receive a tool, whereby it may be rotated to adjust the adjacent cutting device.

95 indicates a gear fixed to the shaft 87 for the arbor 82a, and in mesh with the gear 81, the gear 95 being of the same size as the gear 81, whereby the arbors 82, 82a, are driven at the same speed. 96 indicates an idler fixed to a shaft 97 suitably mounted in the members 84, 85, and meshing with the gear 95. The extended end of the shaft 97 has fixed to it a gear 98 in mesh with a gear secured to the shaft 99 carrying a feed roll 99a. The shaft 99 also has fixed to it a gear 100 which meshes with a gear 100a on the extended end of the shaft 101 for a feed roll 102. The gears above referred to are proportioned to effect a peripheral speed of the feed rolls 99a, 102, equal to the speed of the active edges of the cutting devices 88. As shown in Fig. 10, the feed rolls are disposed at the discharge end of the chute 24 and serve to feed the scrap a to the devices 88.

The cutting devices 88 are of an improved construction in order that each device on one arbor may co-act with a device on the other arbor to effect a shear cut of the scrap a. Referring to Figs. 12 to 17, inclusive, it will be noted that the cutting edge X of each device 88 is provided with a rake, that is, it is inclined relative to the axis of the arbor from a high point x at one end to a low point x' at the other end of such edge; also, that the edge X is disposed at an angle to the direction of feed of the material a; and that the surface of the tool adjacent to the edge X and extending inwardly therefrom toward the tool axis has a curvature, preferably of substantially involute shape, as shown at x'', so that the edge X of the other co-acting tool may follow through or overlap the edge X as the tools revolve about the arbor axes, as shown by the dotted lines $x^2$ (Fig. 17). As will be understood from Figs. 10, 16 and 17, the cutting or shearing edges X of those tools which co-act to effect each shearing cut are reversely related, that is, the rake on and angularity of the edge of one tool are disposed in reversely opposed relations to the rake on and angularity of the edge of the other tool, which disposes the high points $x$ at the corresponding ends of the tools. Accordingly, the two co-acting tools will first engage the adjacent side edge of the scrap $a$, as shown in Figs. 16 and 17, and then shear the metal transversely as the tools continue to revolve. In this co-action of the tools, their edges engage the opposite faces of the scrap as shown in full lines in Figs. 16 and 17, and bite into the metal as these edges approach their edge to edge shearing relation as shown in the dotted line position $y$. In the continued movement of the edges X to the dotted line position $y'$ the shearing operation is completed. The intermediate position of the tool edges shown by the dotted line position $y^2$ (Fig. 16) is indicated by the dotted lines in Fig. 17. In this position the higher portions of the edges X, X, are in overlapping or meshing relation, shown at $x^3$ as above described. By disposing the edges X angularly to the direction of feed of the material, the tool edges maintain a parallel shearing relation with respect to the material as these edges revolve about the tool axes.

From the foregoing description it will be seen that by providing tools mounted on rotatable arbors, providing rakes thereon in reversely opposed relation and arcuate surfaces adjacent such edges to permit a meshing relation of the tool edges as they approach, intersect and recede from the point of contact of the imaginary pitch lines of the tools, I provide for and effect a transverse shearing of the scrap from side edge to side edge.

While I have referred to the mechanisms 2, 2', as mechanisms for cutting scrap material into lengths, each may be adapted for cutting sheet material for various uses and accordingly the invention is not to be limited to the particular material specified.

To those skilled in the art to which my invention relates, many changes in construction and widely differing embodiments and applications of the invention will suggest themselves without departing from the spirit and scope of the invention. My disclosures and the description herein are purely illustrative and not intended to be in any sense limiting.

What I claim is:

1. In apparatus of the class described, the combination with a support and means for supplying and feeding sheet material, of spaced standards, bearing boxes on said standards, sleeves mounted in the bearing boxes on one of said standards, a pair of shafts mounted at one end in and slidably keyed to said sleeves and at their opposite end in the bearing boxes on the other standard, the inner ends of said sleeves being provided with external screw threads, sets of related devices, each threaded on one of said sleeves for adjustment axially thereof, for trimming off the opposite marginal edges of the material, and means for driving said shafts.

2. In apparatus of the class described, the combination with a support and means for supplying and feeding sheet material, of spaced standards, one of which is adjustable on said support, pairs of alined bearing boxes on said standards, shafts mounted in said boxes, a set of devices for trimming off one marginal edge of the material, connecting elements between each device and the adjacent bearing box of the adjustable standard and the adjacent shaft whereby said device is movable with the adjustable standard, and driven by said shaft, said elements being arranged to permit adjustment of said device and connecting element relative to said shaft, a device arranged to engage the trimmed off edge and direct it at an angle to the trimmed material, and a chute having related walls associated with said devices to receive the trimmed-off edge, one wall of said chute being connected to the adjacent adjustable bearing box for adjustment therewith.

3. In mechanism of the class described, the combination with means for supplying and feeding sheet material, of a member mounted to oscillate about an axis and carrying a cutting device, a slide mounted to reciprocate on said member and carrying a cutting device arranged to co-act with the first mentioned device to cut the material into lengths or sections, and means for reciprocating said slide and oscillating said member in co-ordinated relation to move said member about said axis with the material in one direction while said devices are co-acting to cut the material.

4. In mechanism of the class described, the combination with means for supplying and feeding sheet material, of a member mounted to oscillate about an axis and carrying a cutting device, a slide mounted to reciprocate on said member and carrying a cutting device arranged to co-act with the first mentioned device to cut the material into lengths or sections, means for reciprocating said slide, and means for oscillating said member in co-ordinated relation to the movement of said slide to move said member about said axis with the material in one direction while said devices are co-acting to cut the material.

5. In mechanism of the class described, the combination with means for supplying and feeding sheet material, of a member mounted to oscillate about an axis and carrying a cutting device, a slide mounted to reciprocate on said member and carrying a cutting device arranged to co-act with the first mentioned device to cut the material into lengths or sections, means for reciprocating said slide, and means for oscillating said member in co-ordinated relation to the movement of said slide to move said member about said axis with the material in one direction while said devices are co-acting to cut the material, one of said means being cam controlled.

6. In mechanism of the class described, the combination with means for supplying and feeding sheet material, of a driven shaft, a member mounted to oscillate on an axis coincident with the axis of said shaft and carrying a cutting device, a slide mounted to reciprocate on said member and carrying a cutting device arranged to co-act with said first mentioned device to cut the material into lengths or sections, means for reciprocating said slide, said means including a cam on said shaft for moving said slide in one direction, and means for oscillating said member about said axis in co-ordinated relation to the movement of said slide whereby said member moves with the material in one direction while said devices are co-acting to cut the material.

7. In mechanism of the class described, the combination of means for feeding sheet material, and a pair of rotatable members carrying co-acting cutters arranged to cut the material transversely, each cutter having a cutting edge inclined to the axis of the adjacent member and an involute surface adjacent said edge, the cutting edge of the cutter on one member being reversely inclined with respect to the cutting edge of the cutter on the other member.

8. In an apparatus of the class described, the combination with a base, of a pair of standards thereon, one of said standards being adjustable on the base relative to the other standard, journal boxes supported in said adjustable standard, sleeves rotatably mounted in said journal boxes and movable therewith when the adjacent standard is adjusted, shafts slidably fitting into and keyed to said sleeves and rotatably mounted in the other standard, means for driving said shafts, and a set of cutting devices mounted on said sleeves for cutting material fed thereto, said sleeves having externally threaded portions and each said cutting device comprising a plurality of detachably connected sections the inner walls of which are threaded to engage said threaded portion of the adjacent sleeve to permit adjustment axially thereof or removal therefrom.

9. In an apparatus of the class described, the combination with a base, of a pair of standards thereon, one of said standards being adjustable on the base relative to the other standard, journal boxes supported in said adjustable standard, sleeves rotatably mounted in said journal boxes and movable therewith when the adjacent standard is adjusted, shafts slidably fitting into and keyed to said sleeves and rotatably mounted in the other standard, means for driving said shafts, and a set of cutting devices mounted on said sleeves for cutting material fed thereto, each of said cutting devices comprising a plurality of sections and means for detachably securing said sections to the adjacent sleeve.

10. In an apparatus of the class described, the combination with a base, of a pair of standards thereon, one of said standards being adjustable on the base relative to the other standard, journal boxes supported in said adjustable standard, sleeves rotatably mounted in said journal boxes and movable therewith when the adjacent standard is adjusted, shafts slidably fitting into and keyed to said sleeves and rotatably mounted in the other standard, means for driving said shafts, and a set of cutting devices mounted on said sleeves for cutting material fed thereto, each of said cutting devices comprising a plurality of sections and means for detachably connecting of sections and means for detachably connecting said sections together and adjustably and removably securing them to said sleeve.

11. In apparatus of the class described, the combination with means for supplying and feeding sheet material, of means for trimming one marginal edge of the material, means arranged rearward of and below said trimming means for cutting the trimmed-off edge into lengths, and a chute comprising spaced walls for guiding the trimmed-off edge from the trimming devices of said trimming means to the cutting devices of said cutting means, the said chute walls extending forwardly of the trimming devices above and below the marginal edge of the material and arranged to receive the edge in advance of the engagement of the trimming devices with the material.

12. In apparatus of the class described, the combination with means for supplying and feeding sheet material, of means for trimming one marginal edge of the material, said means including a pair of rotatable trimming devices, mechanism rearward of said trimming devices and disposed below the path of movement of the trimmed material for cutting the trimmed-off edge into lengths, and guide walls extending forwardly of said trimming devices and having portions disposed above and below the marginal edge of the material and arranged to receive the marginal edge between them prior to the engagement of said trimming devices with such edge and portions extending downwardly to guide the trimmed-off edge to said cutting mechanism.

13. In apparatus of the class described, the combination with means for supplying and feeding sheet material, of means for trimming one marginal edge of the material, said means including a pair of rotatable trimming devices, mechanism rearward of said trimming devices and disposed below the path of movement of the trimmed material for cutting the trimmed-off edge into lengths, guide walls extending forwardly of said trimming devices and having portions above and below the marginal edge of the material and arranged to receive the marginal edge between them prior to the engagement of said trimming devices with such edge and portions extending downwardly to guide the trimmed-off edge to said cutting mechanism, and a rotatable device rearward of said trimming device for directing the trimmed-off edge into the downwardly extending portions of said guide walls.

14. In mechanism of the class described, the combination of means for feeding sheet material, and a pair of rotatable members carrying co-acting cutters arranged to cut the material transversely, each cutter having a transverse cutting edge inclined to the axis of the adjacent member and an involute surface extending inwardly from the cutting edge of the cutter, the cutting edge of each cutter on one member being reversely inclined with respect to the cutting edge of its co-acting cutter on the other member and arranged to overlap the cutting edge thereof as the edges approach and recede from the point of contact of their imaginary pitch lines.

15. In mechanism of the class described, the combination of a pair of feed rolls for feeding sheet material, a pair of rotatable members carrying co-acting cutters arranged to cut the material transversely, each cutter having a cutting edge inclined to the axis of the adjacent member and an involute surface extending inwardly from said edge, the cutting edge of the cutter on one member being reversely inclined with respect to the cutting edge of the cutter on the other member, and means for driving said rolls and said members.

16. In mechanism for cutting material, the combination of a pair of rotatable members, a cutter on each member disposed longitudinally thereof and having a shearing edge inclined relative to the axis of said member and the direction of feed of the material in reversely opposed relation to the shearing edge of the cutter on the other member, the inwardly extending surfaces of said cutters adjacent their edges being shaped to permit overlapping relation of said edges as they approach, intersect and recede from the imaginary pitch lines of said cutters, and means for driving said members.

17. In mechanism of the class described, the combination with means for supplying and feeding material, of a member mounted to oscillate about an axis and provided with a cutting device, a slide mounted to reciprocate on said member ber and carrying a cutting device arranged to co-act with said first mentioned cutting device to cut the material into lengths, a spring normally tending to move said slide in one direction, a cam for moving said slide in the opposite direction, and means for rotating said cam and oscillating said member in co-ordinated relation to the movement of said slide, whereby said member moves with the material in one direction during the co-action between said cutting devices.

18. In apparatus of the class described, the combination with a support and means for supplying and feeding sheet material, of spaced standards, one of which is adjustable on said support, pairs of alined bearing boxes on said standards, shafts mounted in said boxes, a set of devices for trimming off one marginal edge of the material, connecting elements between each device and the adjacent bearing box of the adjustable standard and the adjustable shaft whereby said device is movable with the adjustable standard, and driven by said shaft, said elements being arranged to permit adjustment of said device and connecting elements relative to said shaft, and means for driving said shafts.

CARL M. YODER.